Jan. 1, 1935. J. N. GOOD 1,986,472
FLUID PRESSURE BRAKE
Filed Oct. 13, 1930
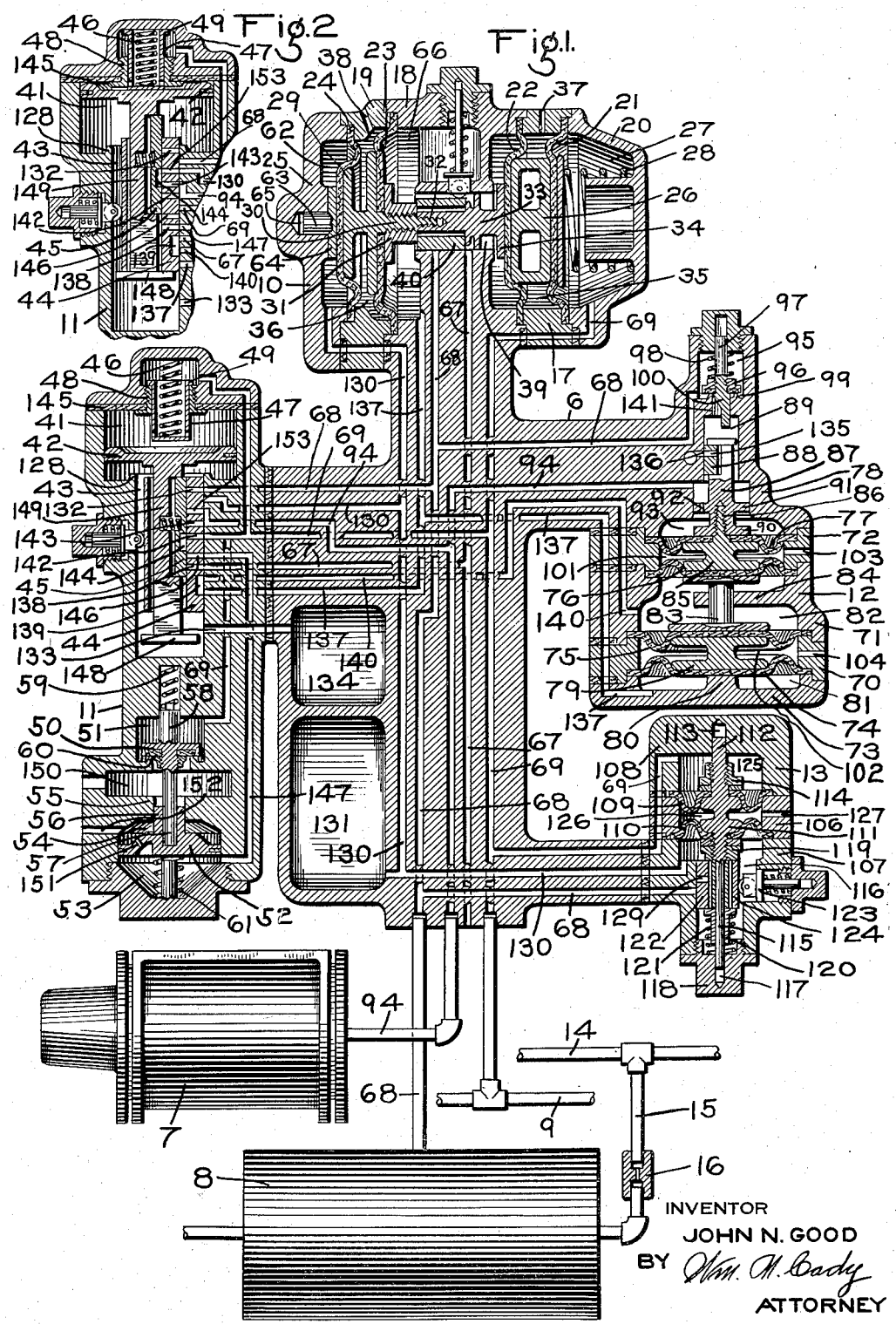
INVENTOR
JOHN N. GOOD
BY Wm. H. Cady
ATTORNEY Patented Jan. 1, 1935

1,986,472

UNITED STATES PATENT OFFICE 1,986,472

FLUID PRESSURE BRAKE

John N. Good, Wilmerding, Pa., assignor to The Westinghouse Air Brake Company, Wilmerding, Pa., a corporation of Pennsylvania Application October 13, 1930, Serial No. 488,268

5 Claims. (Cl. 303—59)

This invention relates to fluid pressure brakes and more particularly to a valve mechanism for controlling the brakes on a car of a train.

An object of the invention is to provide an improved brake controlling valve mechanism of the type in which the means for controlling the communication through which fluid under pressure is supplied from a main reservoir to the brake cylinder is controlled by a service application valve mechanism when a service rate of reduction in brake pipe pressure is effected and by an emergency application valve mechanism when an emergency rate of reduction in brake pipe pressure is effected.

Another object of the invention is to provide an improved valve mechanism of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view, mostly in section, of a fluid pressure brake equipment embodying the invention, showing the same in release position; Fig. 2 is a fragmentary view of the emergency application portion of the equipment, showing the same in emergency position.

In the usual fluid pressure brake equipment employing a brake pipe, auxiliary reservoir, brake cylinder, and triple valve device, the fluid under pressure for charging the auxiliary reservoir is supplied through the brake pipe and a feed groove around the triple valve piston when the brakes are being released, and when the brakes are being applied, there is often a slight back flow of fluid under pressure from the auxiliary reservoir to the brake pipe through said feed groove. It is thus obvious that a considerable amount of fluid under pressure is transmitted through the brake pipe in applying and releasing the brakes, which tend to retard the operation of the triple valve device. By this invention an improved valve mechanism, for controlling the brakes on a car, is provided, in which the above difficulty is obviated.

Referring to the drawing, the equipment may comprise a controlling valve device 6, a brake cylinder 7, a main reservoir 8, and a brake pipe 9. The controlling valve device 6 has a main body portion in the form of a pipe bracket, and said pipe bracket is provided with a service application valve device 10, an emergency application valve device 11, a relay valve device 12, and a check valve device 13 which are all a part of the controlling valve device 6.

A pipe 14, extending throughout the length of the train, is connected to the main reservoir 8 on each car, by a pipe 15 provided with a choke 16. Through the pipe 14 the main reservoirs are adapted to be maintained equal.

The service application valve device 10 comprises a casing divided into sections 17, 18 and 19. Interposed between the section 17 and a cover plate 20 is a flexible diaphragm 21, and interposed between the sections 17 and 18 is a flexible diaphragm 22. At the opposite side of section 18 a flexible diaphragm 23 is interposed between said section and the section 19, and still another flexible diaphragm 24 is interposed between the section 19 and a cover plate 25.

Interposed between diaphragms 21 and 22 is a follower block 26, and contained in chamber 27 at the outer face of the diaphragm 21, is a spring 28 which urges said diaphragm toward the follower block 26.

A follower block 29 is interposed between the diaphragms 23 and 24. On one side the follower block 29 is provided with a threaded stem 30 which extends through the diaphragm 23. Mounted on the stem 30 is a flanged nut 31 which clamps the diaphragm 23 against the follower block 29.

Contained in chamber 62 between the diaphragm 24 and the cover plate 25, is a pin 63, having a head 64 which bears against the face of the diaphragm 24 and is secured thereto by means of a suitable cement. The shank of the pin 63 is mounted in a suitable bore 65 formed in the cover plate 25. This provides means for guiding the pin 63 and diaphragm 24 during the operation of the device.

A threaded extension 32 of the stem 30 is mounted in a threaded bore of a stem 33. At the opposite end, the stem 33 has a head 34 for engaging the diaphragm 22 and urging the same toward the follower block 26.

Formed on a lug extending upwardly in chamber 66 between the diaphragms 22 and 23, is a seat 39 for a slide valve 40. The slide valve 40 is operatively mounted between a shoulder on the stem 33 and the head of the nut 31. The purpose of the slide valve 40 is to control communication between chamber 66 and passages 67 and 68 in the casing.

Chamber 35 between the diaphragms 21 and 22, and chamber 36 between the diaphragms 23 and 24 are permanently in communication with the atmosphere, through passages 37 and 38 respectively.

The emergency application valve device 11 comprises a quick action portion and a vent valve portion.

The quick action portion of the emergency valve device 11 may comprise a casing having a chamber 41 containing a piston 42 and a chamber 43 containing a main slide valve 44 and an auxiliary slide valve 45, adapted to be operated by said piston.

A spring 46 is contained in the chamber 41 and acts against a retaining member 47 slidably mounted in a nut 48 having screw-threaded engagement in the casing. The downward movement of the member 47 is limited by the engagement of a flange 49 on said member with the upper face of the nut 48.

The vent valve portion of the emergency valve device 11 may comprise a brake pipe vent valve 50 contained in a chamber 51 and a piston 52 for operating said vent valve. The piston 52 has a chamber 53 at one side and a chamber 54 at the opposite side, and slidably mounted in a suitable bore in the partition wall 55 of the casing is a stem 56 of said piston.

The vent valve 50 has a stem 57 extending into a bore in stem 56 of the piston 52. The vent valve 50 also has a stem 58 at the opposite side extending into a bore in the casing, said bore containing a spring 59 which acts on the stem 58 and urges the vent valve 50 toward a seat rib 60.

Contained in the chamber 53, is a spring 61 for maintaining the piston 52 in engagement with the valve stem 57.

The brake pipe 9 is connected to chamber 27 of the service application valve device 10, and also to piston chamber 41, the seat of the main slide valve 44, and vent valve chamber 51 of the emergency application valve device 11, by a passage and pipe 69.

The relay valve device 12 may comprise a casing divided into sections 70, 71 and 72. Interposed between the section 70 and a cover plate 73 is a flexible diaphragm 74, and interposed between the sections 70 and 71 is a flexible diaphragm 75. At the opposite side of section 71 a flexible diaphragm 76 is interposed between said section and the section 72, and still another flexible diaphragm 77 is interposed between the section 72 and the portion 78 of the casing.

Interposed between the diaphragms 74 and 75 is a follower block 79. The outer face of diaphragm 74 normally engages a stop lug 80 which projects into chamber 81 from the cover plate 73.

Contained in chamber 82 between the diaphragms 75 and 76 is a follower block 83 having an intermediate shank portion mounted in an opening formed in a lug 84 projecting into said chamber 82 from the outer wall of the section 71 of the casing. At each end the follower block 83 has wide flanges for bearing against the diaphragms 75 and 76 respectively.

A follower block 85 is interposed between the diaphragms 76 and 77. On one side the follower block 85 is provided with a threaded stem 86 which extends through the diaphragm 77. Mounted on the stem 86 is a stem 87 for a slide valve 88 contained in a chamber 89. The stem 87 is provided with a flange 90 at its lower end, and the diaphragm 77 is clamped between this flange and the follower block 85. Intermediate its length the stem 87 is provided with a second flange 91 which engages the walls of valve chamber 89 so as to provide means for guiding the stem 87. An opening 92 is formed in the flange 91 so that valve chamber 89 is in communication with chamber 93 on the upper side of the diaphragm 77.

Chamber 89 and the seat of the main slide valve 44 of the emergency application valve device 11 are connected to the brake cylinder 7 by a passage and pipe 94.

Contained in a chamber 95 is a valve 96. At one side the valve 96 has a stem 97 which extends into a bore in the casing, and encircling said stem is a spring 98 which acts on the valve 96 and urges the same toward a seat rib 99. On the opposite side the valve 96 has a stem 100 which extends into chamber 89 and is adapted to be engaged by the upper end of the valve stem 87 during the operation of the device, as will be hereinafter described.

Valve chamber 95 of the relay valve device 12, the seat of the slide valve 40 of the service application valve device 10, and the seat of the main slide valve 44 of the emergency application valve device 11, are connected to the main reservoir 8, by passage and pipe 68.

Chamber 101 between the diaphragms 76 and 77, and chamber 102 between the diaphragms 74 and 75 are permanently in communication with the atmosphere, through passages 103 and 104 respectively.

The check valve device 13 comprises a casing divided into sections 106 and 107. Interposed between the section 106 and a cover 108 is a flexible diaphragm 109 and interposed between the sections 106 and 107 is a flexible diaphragm 110.

A follower block 111 is interposed between the diaphragms 109 and 110. On one side the follower block 111 is provided with a stem 112 which extends through the diaphragm 109 and terminates in a bore 113 formed in the cover 108. A portion of the stem 112 is threaded and mounted on this portion of the stem is a nut 114 which clamps the diaphragm 109 against the follower block 111.

On the opposite side the follower block 111 is provided with a stem 115 which projects downwardly through a chamber 116 and terminates in a suitable bore 117 in a cap screw 118 on the bottom of the section 107.

The upper portion of the stem 115 is threaded and mounted on this portion of the stem is a nut 119 which clamps the diaphragm 110 against the follower block 111.

Slidably mounted on the lower portion of the stem 115 is a flanged sleeve-like member 120 and interposed between said member and the cap screw 118 is a spring 121.

Operatively mounted between the nut 119 and the sleeve 120 is a slide valve 122 which has a seat along one side of the chamber 116. The slide valve 122 is maintained seated by a spring-pressed plunger 123 which engages the wing portion 124 of the slide valve.

Chamber 125 on the upper side of the diaphragm 109 is connected to the brake pipe 9 by passage 69, heretofore described.

Chamber 126 formed intermediate the diaphragms 109 and 110 is in constant communication with the atmosphere, through passage 127.

In operation, when a train is made up of cars provided with the present equipment, the several chambers, etc. will be uncharged.

When fluid under pressure is supplied to the brake pipe 9, by the operation of a brake valve device (not shown) in the well known manner, fluid flows from the brake pipe, through pipe and passages 69, to diaphragm chamber 27 of the service application valve device 10, piston chamber 41 and valve chamber 43 of the emergency valve device 11, and diaphragm chamber 125 of the check valve device 13, charging said chambers with fluid at brake pipe pressure.

With the chamber 62 initially uncharged, as has been described, and with chamber 66 connected to the atmosphere through passage 67, the pressure of fluid in chamber 27 deflects the diaphragms 21, 22, 23 and 24 to the left until the head 64 of the pin 63 engages the end wall of the cover plate 25. The pressure of fluid in the emergency piston chamber 41 forces the piston 42 and slide valves 44 and 45 downwardly to their extreme lower positions, in which the piston 42 engages the seat rib 128, and the pressure of fluid in diaphragm chamber 125 of the check valve device 13 deflects the diaphragms 109 and 110 downwardly, thereby shifting the slide valve 122 downwardly to a position in which a port 129 in said slide valve registers with passage 68.

Fluid under pressure from the main reservoir 8 flows through pipe and passages 68 to the seat of the service application slide valve 40, to the seat of the emergency slide valve 44, and to the seat of the slide valve 122 of the check valve device 13.

With the slide valve 122 of the check valve device 13 shifted downwardly, as hereinbefore described, fluid at main reservoir pressure flows from passages 68, through port 129 in the slide valve 122 to valve chamber 116 and from thence through passage 130 to the control reservoir 131, to the diaphragm chamber 62 of the service application valve device 10, and to the seat of the emergency slide valve 44.

When the pressure in diaphragm chamber 116 of the check valve device 13 becomes equal to or slightly greater than the brake pipe pressure acting in diaphragm chamber 125, then the diaphragms 109 and 110 are deflected upwardly, permitting spring 121 to shift the slide valve 122 upwardly and lap passage 68, so as to prevent further flow of fluid under pressure from the main reservoir 8 to the control reservoir 131.

With the diaphragm chamber 62 of the service application valve device 10 charged with fluid at substantially the same pressure as that carried in the brake pipe 9 and acting in diaphragm chamber 27, the pressure of spring 28 maintains the service application valve device in the normal running position, as shown in the drawing.

The brake pipe pressure acting in chamber 41 of the emergency valve device 11, causes the piston 42 to shift the slide valves 44 and 45 to their extreme downward positions respectively, in which a port 132 in the main slide valve 44 registers with passage 68 from the main reservoir 8, and port 132 is uncovered by the auxiliary slide valve 45. Fluid under pressure is thus permitted to flow from the main reservoir 8 into valve chamber 43 and from thence through a passage 133 to quick action chamber 134.

When the pressure in the quick action chamber 134 and valve chamber 43 becomes slightly greater than the brake pipe pressure acting in the piston chamber 41, the piston 42 is shifted upwardly, causing the auxiliary slide valve 45 to move relative to the main slide valve 44 and thereby lap port 132, so as to prevent further flow of fluid under pressure to the chambers 43 and 134.

After the port 132 is lapped, the piston 42 continues to move upwardly, and as the volume of the valve chamber 43 increases, the pressure in said chamber correspondingly reduces, and when the pressure in the valve chamber 43 has thus been reduced to substantially brake pipe pressure acting on the opposite side of the piston 42, further upward movement of the piston ceases, and the piston remains in a position, as shown in the drawing.

With the equipment thus fully charged, the brake cylinder 7 is connected to the atmosphere through pipe and passage 94, valve chamber 89 of the relay valve device 12, a port 135 in the slide valve 88, and atmospheric passage 136.

When it is desired to effect a service application of the brakes, the pressure of the fluid in the brake pipe 9 is gradually reduced in the usual manner. Since the diaphragm chamber 27 of the service application valve device 10 is connected to the brake pipe, the pressure therein is also reduced a corresponding degree.

Since the valve chamber 66 is normally at atmospheric pressure, due to the atmospheric connection by way of passage 67 and the diaphragm chamber 62 is charged with fluid substantially equal to the brake pipe pressure effective in the diaphragm chamber 27, when the brake pipe pressure in diaphragm chamber 27 is reduced below the pressure of fluid in diaphragm chamber 62, the pressure in chamber 62, acting on the diaphragm 24, causes the diaphragm 24 to operate and deflect the other diaphragms 21, 22 and 23 to the right, thereby shifting the slide valve 40 to service position, in which passage 67 is lapped and passage 68 from the main reservoir 8 is uncovered.

When the brake pipe pressure is gradually reduced in effecting a service application of the brakes, such reduction being also effective in piston chamber 41 of the emergency valve device 11, permits the pressure of fluid in the valve chamber 43 to shift the emergency piston 41 and auxiliary slide valve 45 upwardly until the piston 42 comes into engagement with the retaining member 47.

In this position, the brake pipe passage 69 is connected to passage 94 through ports 142 and 143 in the main slide valve 44 and cavity 144 in the auxiliary slide valve 45, thereby permitting fluid under pressure to flow from the brake pipe to the brake cylinder and effect a quick service reduction in brake pipe pressure in the usual well known manner.

With the auxiliary slide valve 45 in this position, a port 138 in the main slide valve 44 is uncovered. The port 138 registers with the atmospheric passage 67 in the main slide valve seat, so that fluid under pressure in the valve chamber 43 and quick action chamber 134 is thus permitted to flow to the atmosphere at a rate substantially equal to the rate of reduction in brake pipe pressure. When the pressure in valve chamber 43 is thus reduced to a degree slightly less than the reduced brake pipe pressure, then the piston 42 shifts the auxiliary slide valve 45 back to its normal position.

When the slide valve 40 of the service application valve device 10 uncovers passage 68, in the manner heretofore described, fluid under pressure is permitted to flow from the main reservoir 8 to valve chamber 66. From chamber 66 the fluid flows to the diaphragm chamber 81 of the relay valve device 12, through passage 137, and also to diaphragm chamber 82 of the relay valve device, through pasage 137, cavity 139 in the main slide valve 44 of the emergency application valve device 11, and passage 140.

With fluid under pressure thus supplied to chambers 81 and 82 from the valve chamber 66 of the service application valve device, the pressures acting on the opposite faces of the diaphragms 74 and 75 will be balanced, and therefore the fluid under pressure in chamber 82 acting on the lower face of the diaphragm 76 moves the parts of the relay valve device upwardly, thereby causing the slide valve 88 to be shifted and lap the atmospheric passage 136.

In the upward movement of the slide valve 88, the stem 87 engages the depending valve stem 100, and lifts the valve 96 from its seat.

With the atmospheric passage 136 thus lapped by the slide valve 88 and the valve 96 unseated, fluid under pressure is permitted to flow from the main reservoir 8 to the valve chamber 89, through pipe and passage 68, valve chamber 95 and opening 141, and from the valve chamber 89 through passage and pipe 94, to the brake cylinder 7, thereby applying the brakes.

The brake cylinder pressure effective in chamber 66 of the service application valve device 10 acts on the right side of diaphragm 23 and on the left side of diaphragm 22. The diaphragm 23 is larger in area than the diaphragm 22, so that the difference in opposing forces on said diaphragms 22 and 23 tends to deflect all of the diaphragms and shift the slide valve 40 to the left. When the difference in pressure acting on the diaphragms 22 and 23 thus becomes sufficient to slightly overbalance the difference between the pressure in diaphragm chamber 62 acting on diaphragm 24 and the reduced brake pipe pressure in diaphragm chamber 27 acting on the diaphragm 21, the diaphragms are deflected to the left, thereby causing the slide valve 40 to be shifted and lap the fluid pressure supply passage 68, so as to prevent the further flow of fluid under pressure to the diaphragm chambers 81 and 82 of the relay valve device 12.

At the same time that fluid under pressure is being supplied from the valve chamber 89 to the brake cylinder, through passage 94, the diaphragm chamber 93 is also supplied with fluid under pressure from the valve chamber 89, through opening 92.

As soon as the pressure of the fluid thus supplied to chamber 93 slightly overbalances the pressure of the fluid bottled up in chamber 82 on the opposite sides of the diaphragms 76 and 77, the diaphragms will be deflected downwardly by the pressure of the fluid in chamber 93 acting on the diaphragm 77. This action withdraws the stem 87 from its engagement with the end of the stem of valve 96, thereby permitting the valve 96 to seat under the action of the spring 98, so as to prevent further flow of fluid under pressure to the brake cylinder.

It is obvious from the above description of the operation of the valve mechanism in effecting a service application of the brakes, that the degree of brake cylinder pressure obtained depends upon the degree of brake pipe reduction effected. Consequently, the brake pipe pressure may be reduced in steps and the brake cylinder pressure will build up in proportional steps, thereby effecting a graduated application of the brakes.

In order to release the brakes after a service application, the brake pipe 9 is recharged with fluid under pressure. When the brake pipe pressure is thus increased, this causes a corresponding increase in pressure in diaphragm chamber 27 of the service application valve device 10. When the pressure in chamber 27 acting on the right side of the diaphragm 21 overbalances the pressure in chamber 66 acting on the opposite side of the diaphragm 22, the diaphragms will be deflected toward the left by the higher pressure in chamber 27, and this action shifts the slide valve 40 to the left, thereby uncovering atmospheric passage 67.

Since the chamber 82 of the relay valve device 12 is connected to chamber 66 of the service application valve device 10 by passage 140, cavity 139 in the main slide valve 44 of the emergency application valve device 11, and passage 137, and since the chamber 81 of the relay valve device 12 is also connected to chamber 66 of the service application valve device 10 by passage 137, when the slide valve 40 uncovers the passage 67 and the chamber 66 is connected to the atmosphere, the fluid under pressure in chambers 81 and 82 will also be vented to the atmosphere through passage 67. The higher fluid pressure in chamber 93, acting on the upper face of the diaphragm 77, then deflects the diaphragms 74, 75, 76 and 77 downwardly, thereby shifting the slide valve 88 also downwardly and connecting port 135 with atmospheric passage 136. In this way fluid under pressure is vented from the brake cylinder 7 to the atmosphere by way of pipe and passage 94, valve chamber 89, port 135 in the slide valve 88, and atmospheric passage 136, thereby releasing the brakes.

In releasing after a service application of the brakes, the emergency valve portion is shifted to its extreme downward position in which the valve chamber 43 and quick action chamber 134 are recharged in the same manner as in initially charging the equipment.

If it is desired to effect an emergency application of the brakes, the brake pipe pressure is suddenly reduced, thereby effecting a sudden reduction in pressure in the diaphragm chamber 27 of the service application valve device 10, and in the piston chamber 41 of the emergency application valve device 11.

When the pressure is suddenly reduced in the diaphragm chamber 27, this permits the higher pressure in the diaphragm chamber 62 to deflect the diaphragms 21, 22, 23 and 24 to the right, thereby shifting the slide valve 40 and permitting fluid under pressure to flow from the main reservoir 8 to the chamber 81 of the relay valve device and also to the seat of the main slide valve 44 of the emergency application valve device 11, through pipe and passage 68, diaphragm chamber 66, and passage 137. However, since the main slide valve 44 laps the passage 137, the communication is cut off through which the diaphragm chamber 82 of the relay valve device 12 is supplied with fluid under pressure from the main reservoir 8. Therefore, when an emergency application of the brakes is effected, only diaphragm chamber 81 is supplied with fluid under pressure from the main reservoir, and the pressure of the fluid thus supplied to said chamber acting on the face of the large diaphragm 74 deflects the diaphragms 74, 75, 76 and 77 upwardly. Whereupon the parts of the relay valve device are operated so as to permit fluid under pressure to flow to the brake cylinder from the main reservoir in a manner similar to that heretofore described.

When the pressure is suddenly reduced in the emergency piston chamber 41, this permits the pressure in valve chamber 43 to shift the emergency piston 42 and slide valves 44 and 45 upwardly to the extreme upper position as shown in Fig. 2. This action compresses the spring 46 and causes the piston 42 to seal against the gasket 145. In emergency position, the passage 137 is lapped by the slide valve 44, as has been described.

When the emergency piston 42 moves to emergency position, the auxiliary slide valve 45 initially uncovers port 138 and a port 146 in the main slide valve 44, thereby permitting fluid under pressure from the valve chamber 43 and quick action chamber 134 to flow through port 138 and passage 67 to the atmosphere, and through port 146 and passage 147 to the vent valve piston chamber 53 for a reason to be hereinafter more fully described.

As the piston 42 continues to move toward emergency position, the main slide valve 44 is engaged by a flange 148 at the end of the piston stem 149, and is thereby also moved upwardly to emergency position, in which the port 138 is disconnected from the atmospheric passage 67 and connected to passage 147, so that fluid under pressure continues to flow to the vent valve piston chamber 53.

Fluid under pressure thus supplied to the vent valve piston chamber 53, shifts the piston 52 upwardly, thereby unseating the brake pipe vent valve 50. This action permits fluid under pressure to be suddenly vested from the brake pipe 9 to the atmosphere, through passage 69, vent valve chamber 51, past vent valve 50 and from thence through the atmospheric chamber 150, so as to transmit serially the sudden emergency reduction in brake pipe pressure, in the usual manner.

In the emergency position of the slide valve 44, fluid under pressure in valve chamber 43 and quick action chamber 134 is vented to the quick action piston chamber 53, from whence it flows to the atmosphere through a port 151 in the quick action piston 52 and an atmospheric passage 152. By thus venting fluid under pressure only through the port 151, the piston 52 maintains the vent valve 50 unseated for a period of time sufficient to completely vent the fluid under pressure from the brake pipe.

With the emergency piston 42 and the slide valves 44 and 45 in emergency position, the cavity 144 in the auxiliary slide valve 45 connects ports 143 and 153 in the main slide valve 44. The port 153 registers with passage 130 from the control reservoir 131 and the port 143 registers with passage 94 from the brake cylinder 7, so that fluid under pressure is permitted to flow from the control reservoir 131 to the brake cylinder by way of cavity 144.

It will be noted that when an emergency application of the brakes is effected, both the main reservoir 8 and control reservoir 131 are connected to the brake cylinder, so that a high brake cylinder pressure is obtained, whereas when a service application of the brakes is effected, a brake cylinder pressure proportional to the brake pipe reduction, as governed by the operation of the service application valve device 10 and the relay valve device 12, is obtained. Moreover, the rate of build up of brake cylinder pressure in an emergency application is much faster than in a service application, since fluid under pressure is supplied to the brake cylinder by the operation of the emergency valve device 11, as well as by the service application valve device 10 and the relay valve device 12.

It will further be noted that the propagation of quick serial venting of fluid under pressure from the brake pipe 9 to the atmosphere is hastened, by permitting fluid under pressure to flow to the vent valve piston chamber 53 before the main slide valve 44 is moved, by way of port 146 in said slide valve and passage 147. This is an advantage, in that when the emergency piston stem flange 148 engages the main slide valve 44, there will be a slight hesitation before the main slide valve is moved, in order to obtain a greater difference in pressure on the opposite sides of the emergency piston 42, as required to move said slide valve.

Thus, during this hesitation, the vent valve piston chamber 53 is partly charged with fluid under pressure, so that when the main slide valve 44 is moved to emergency position the vent valve 52 will be operated at once.

There is another advantage in supplying fluid under pressure to the vent valve piston chamber 53 without shifting the main slide valve from its normal position, as for instance, if the main slide valve fails to move, the brake pipe vent valve 60 will be operated to suddenly reduce the brake pipe pressure in order to propagate the emergency action as hereinbefore described.

If for any reason, the control reservoir 131 becomes charged with fluid at a pressure greater than the pressure carried in the brake pipe, than that pressure acting in the diaphragm chamber 62 of the service application valve device 10 will cause the relay valve device 12 to operate to effect an application of the brakes in a degree proportional to the amount of overcharge or the difference in pressure in said reservoir and in the brake pipe. This is obvious since it is the same as if the brake pipe pressure were reduced an amount equal to the degree of overcharge.

In case the control reservoir 131 does become overcharged, then in order to reduce the pressure in said reservoir, an emergency application of the brakes is effected in the same manner as hereinbefore described. The control reservoir 131 is thereby connected to the brake cylinder 7 through the emergency portion 11 and the pressure in said reservoir reduces by flow to the brake cylinder. The brakes may then be released and the control reservoir will then recharge to the pressure carried in the brake pipe.

It will be noted that the brake pipe 9 is only a medium through which fluid under pressure is supplied to or vented from the service application value device diaphragm chamber 27, emergency piston chamber 41 and check valve diaphragm chamber 125, and as the combined volumes of the brake pipe and said chambers may be quite small, the pressure of the fluid therein may be varied rapidly in order to expedite the application and release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder and a brake pipe, of a supply valve for controlling the supply of fluid under pressure to the brake cylinder, a movable abutment subject to the opposing pressures of the brake cylinder and a chamber for operating said valve, a controlling valve, a movable abutment operated upon a reduction in brake pipe pressure for supplying fluid under pressure to said chamber, an additional movable abutment for controlling the operation of said supply valve, and an emergency valve device operated upon a sudden reduction in brake pipe pressure for controlling the operation of said additional abutment.

2. In a fluid pressure brake, the combination with a brake cylinder, and brake pipe, of a supply valve for controlling the supply of fluid under pressure to the brake cylinder, a movable abutment subject to the opposing pressures of the brake cylinder and a chamber for operating said valve, a controlling valve, a movable abutment operated upon a reduction in brake pipe pressure for supplying fluid under pressure to said chamber, an additional movable abutment subject to the opposing pressures of said chamber and an additional chamber for also operating said supply valve, and an emergency valve device normally connecting said chambers and operated upon an emergency reduction in brake pipe pressures for connecting the first chamber to the atmosphere.

3. In a fluid pressure brake, the combination with a brake cylinder, main reservoir and brake pipe, of a valve device for controlling communication through which fluid under pressure is supplied to the brake cylinder from the main reservoir, a control reservoir, valve mechanism subject to the opposing pressures of the brake pipe and said control reservoir for supplying fluid under pressure from the main reservoir to said control reservoir and for maintaining the pressure in said control reservoir constant except in emergency, and valve means subject to the opposing pressures of the brake pipe and said control reservoir for controlling the operation of said valve device.

4. In a fluid pressure brake, the combination with a brake cylinder, main reservoir, and brake pipe, of means operated by variations in fluid under pressure for controlling a communication through which fluid under pressure is supplied to the brake cylinder from the main reservoir, a valve device subject to brake pipe pressure and the pressure in a chamber for controlling the operation of said means, and valve means governed by the opposing pressures of said brake pipe and said chamber for controlling the supply of fluid under pressure from said main reservoir to said chamber and for maintaining a constant pressure in said chamber.

5. In a fluid pressure brake, the combination with a brake cylinder and brake pipe, of a supply valve for controlling the supply of fluid under pressure to the brake cylinder, means for operating said supply valve comprising a pair of diaphragms, one of said diaphragms being subject to the opposing pressures of the brake cylinder and a chamber and the other diaphragm being subject to the pressure of fluid in said chamber and a second chamber, a valve for controlling the supply of fluid to said first chamber, means operated upon a gradual reduction in brake pipe pressure for operating said control valve, and means operated upon a sudden reduction in brake pipe pressure for connecting the first chamber to the atmosphere and for supplying fluid under pressure to said second chamber.

JOHN N. GOOD.